United States Patent
Mori

(10) Patent No.: US 9,458,275 B2
(45) Date of Patent: Oct. 4, 2016

(54) CROSS-LINKABLE RUBBER COMPOSITION AND CROSS-LINKED RUBBER

(71) Applicant: ZEON CORPORATION, Tokyo (JP)

(72) Inventor: Kentaro Mori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/427,533

(22) PCT Filed: Sep. 25, 2013

(86) PCT No.: PCT/JP2013/075828
§ 371 (c)(1),
(2) Date: Mar. 11, 2015

(87) PCT Pub. No.: WO2014/050853
PCT Pub. Date: Apr. 3, 2014

(65) Prior Publication Data
US 2015/0246991 A1    Sep. 3, 2015

(30) Foreign Application Priority Data
Sep. 26, 2012 (JP) ................................. 2012-212207

(51) Int. Cl.
| C08F 236/12 | (2006.01) |
| C08J 3/24 | (2006.01) |
| C08K 5/17 | (2006.01) |
| C08L 9/02 | (2006.01) |
| C08K 5/05 | (2006.01) |
| C08K 5/06 | (2006.01) |
| C09K 3/10 | (2006.01) |
| C08F 222/06 | (2006.01) |
| C08K 5/205 | (2006.01) |

(52) U.S. Cl.
CPC ........... *C08F 236/12* (2013.01); *C08F 222/06* (2013.01); *C08K 5/05* (2013.01); *C08K 5/06* (2013.01); *C08K 5/17* (2013.01); *C08K 5/205* (2013.01); *C08L 9/02* (2013.01); *C09K 3/10* (2013.01); *C08J 3/24* (2013.01); *C08J 2309/02* (2013.01); *C09K 2200/0612* (2013.01)

(58) Field of Classification Search
CPC .... C08J 3/24; C08J 2309/02; C08J 2333/20; C08K 5/053; C08K 5/17; C08K 5/175; C08K 5/19; C08K 2200/0612; C08L 9/02; C08F 236/12

USPC .......... 525/329.2, 329.3, 379, 381, 382, 384
See application file for complete search history.

(56) References Cited

U.S. PATENT DOCUMENTS

| 6,657,014 B1 | 12/2003 | Mori et al. |
| 2007/0037930 A1 | 2/2007 | Odagawa et al. |
| 2010/0168302 A1 | 7/2010 | Nagamori et al. |
| 2010/0222445 A1 | 9/2010 | Nakano |
| 2012/0059123 A1 | 3/2012 | Nakano |
| 2012/0172509 A1 | 7/2012 | Nagamori et al. |
| 2013/0102725 A1 | 4/2013 | Nagamori et al. |
| 2013/0237667 A1* | 9/2013 | Brandau ................. C08C 19/38 525/123 |

FOREIGN PATENT DOCUMENTS

| JP | S56-070038 A | 6/1981 |
| JP | H04-151078 A | 5/1992 |
| JP | 2001-055471 A | 2/2001 |
| JP | 2010-222576 A | 10/2010 |
| JP | 2011-195808 A | 10/2011 |
| JP | 2012-031311 A | 2/2012 |
| WO | 2005/030859 A1 | 4/2005 |
| WO | 2007/072900 A1 | 6/2007 |
| WO | WO 2011/141275 A3 * | 11/2011 |

OTHER PUBLICATIONS https://web.archive.org/web/20120814222549/http://en.wikipedia.org/wiki/Fatty_alcohol.*
Oct. 29, 2013 International Search Report issued in International Application No. PCT/JP2013/075828.
Mar. 1, 2016 Search Report issued in European Application No. 13842366.0.
Vulcanization activate agent NOC Master EGS (5) Application for Acrylic rubber, NOC Technical Note No. 616; Ouch Shinko Chemical Industrial Co., Ltd. http://www.jp-noc.co.jp, Society Announcement 109.

* cited by examiner

Primary Examiner — Roberto Rabago
(74) Attorney, Agent, or Firm — Oliff PLC

(57) ABSTRACT

A cross-linkable rubber composition containing a carboxyl group-containing nitrile rubber (A) with an iodine value of 120 or less, a polyamine cross-linking agent (B), and a specific basic cross-linking accelerator (C) is provided. The basic cross-linking accelerator (C) is preferably dicyclopentylamine or dicyclohexylamine.

10 Claims, No Drawings

CROSS-LINKABLE RUBBER COMPOSITION AND CROSS-LINKED RUBBER

TECHNICAL FIELD

The present invention relates to a cross-linkable rubber composition which can give cross-linked rubber which is excellent in compression set resistance and cross-linked rubber which is obtained using the cross-linkable rubber composition.

BACKGROUND ART

In the past, nitrile rubber (acrylonitrile-butadiene copolymer rubber) has been used as a material for hoses, tubes, and other automobile use rubber parts by taking advantage of its oil resistance, mechanical properties, chemical resistance, etc. Further, hydrogenated nitrile rubber (hydrogenated acrylonitrile-butadiene copolymer rubber) which is obtained by hydrogenating the carbon-carbon double bonds in the polymer main chain of nitrile rubber is further excellent in heat resistance, so is used for belts, hoses, diaphragms, and other rubber parts.

In this situation, Patent Document 1 proposes a cross-linkable rubber composition which contains a hydrogenated nitrile rubber having α,β-ethylenically unsaturated dicarboxylic acid monoester monomer units, a polyamine-based cross-linking agent, and a basic cross-linking accelerator. Using this composition, cross-linked rubber which is considerably improved in heat resistance and compression set resistance is obtained, but further improvement in compression set resistance has been sought.

PRIOR ART DOCUMENTS

Patent Documents

Patent Document 1: Japanese Patent Publication No. 2001-55471A (U.S. Pat. No. 6,657,014)

DISCLOSURE OF THE INVENTION

Problem to be Solved by the Invention

The present invention has as its object the provision of a cross-linkable rubber composition which can give cross-linked rubber which is excellent in compression set resistance and cross-linked rubber which is obtained using that cross-linkable rubber composition.

Means for Solving the Problems

The inventors engaged in intensive studies to achieve the above object and as a result discovered that the above object can be achieved by a cross-linkable rubber composition which comprises a carboxyl group-containing nitrile rubber with an iodine value of 120 or less into which a polyamine cross-linking agent and a specific basic cross-linking accelerator are blended and thereby completed the present invention.

That is, according to the present invention, there is provided a cross-linkable rubber composition containing a carboxyl group-containing nitrile rubber (A) with an iodine value of 120 or less, a polyamine cross-linking agent (B), and a basic cross-linking accelerator (C) which is expressed by the following general formula (1).

$$R^1\text{—NH—}R^2 \tag{1}$$

(Where in general formula (1), $R^1$ and $R^2$ are, respectively independently, alkyl groups containing 1 to 12 carbon atoms which may have substituents or cycloalkyl groups containing 5 to 12 carbon atoms which may have substituents.)

Further, the basic cross-linking accelerator (C) is preferably one expressed by the following general formula (2).

$$R^3\text{—NH—}R^4 \tag{2}$$

(Where in general formula (2), $R^3$ and $R^4$ are, respectively independently, cycloalkyl groups containing 5 to 8 carbon atoms.)

Further, the basic cross-linking accelerator (C) is preferably dicyclopentylamine or dicyclohexylamine.

Further, the cross-linkable rubber composition preferably further contains an alkyleneglycol.

Furthermore, the basic cross-linking accelerator (C) preferably forms a salt with the alkyleneglycol.

Further, the cross-linkable rubber composition preferably further contains an alkyl alcohol containing 5 to 20 carbon atoms.

Further, according to the present invention, there is provided a cross-linked rubber obtained by cross-linking the above cross-linkable rubber composition. The cross-linked rubber is preferably a seal member.

Effects of the Invention

According to the present invention, it is possible to provide a cross-linkable rubber composition which can give cross-linked rubber which is excellent in compression set resistance. Further, according to the present invention, it is possible to provide cross-linked rubber excellent in compression set resistance which is obtained by cross-linking that cross-linkable rubber composition.

DESCRIPTION OF EMBODIMENTS

Cross-Linkable Rubber Composition

The cross-linkable rubber composition of the present invention contains a carboxyl group-containing nitrile rubber (A) with an iodine value of 120 or less, a polyamine cross-linking agent (B), and a basic cross-linking accelerator (C) which is expressed by the following general formula (1).

$$R^1\text{—NH—}R^2 \tag{1}$$

(Where in general formula (1), $R^1$ and $R^2$ are, respectively independently, alkyl groups containing 1 to 12 carbon atoms which may have substituents or cycloalkyl groups containing 5 to 12 carbon atoms which may have substituents.)

Carboxyl Group-Containing Nitrile Rubber (A)

First, the carboxyl group-containing nitrile rubber (A) with an iodine value of 120 or less which is used in the present invention will be explained. The carboxyl group-containing nitrile rubber (A) with an iodine value of 120 or less which is used in the present invention (below, sometimes simply referred to as a "carboxyl group-containing nitrile rubber (A)") is rubber with an iodine value of 120 or less which was obtained by copolymerization of an α,β-ethylenically unsaturated nitrile monomer, carboxyl group-containing monomer, and, used in accordance with need, a conjugated diene monomer, α,β-ethylenically unsaturated monocarboxylic acid ester monomer, etc.

The α,β-ethylenically unsaturated nitrile monomer is not particularly limited so long as an α,β-ethylenically unsaturated compound which has a nitrile group. For example, acrylonitrile; α-chloroacrylonitrile, α-bromoacrylonitrile, or other α-halogenoacrylonitrile; methacrylonitrile or other α-alkylacrylonitrile; etc. may be mentioned. Among these as well, acrylonitrile and methacrylonitrile are preferable, while acrylonitrile is more preferable. The α,β-ethylenically unsaturated nitrile monomer may be used as a single type alone or a plurality of types combined.

The content of the α,β-ethylenically unsaturated nitrile monomer units is preferably 10 to 60 wt % with respect to the total monomer units, more preferably 10 to 50 wt %, furthermore preferably 15 to 50 wt %. If the content of the α,β-ethylenically unsaturated nitrile monomer units is too small, the obtained cross-linked rubber is liable to fall in oil resistance, while if too large, the cold resistance may fall.

The carboxyl group-containing monomer is not particularly limited so long as a monomer which can copolymerize with an α,β-ethylenically unsaturated nitrile monomer and having at least one unsubstituted (free) carboxyl group which is not esterified etc. By using a carboxyl group-containing monomer, it is possible to introduce carboxyl groups into the nitrile rubber.

As the carboxyl group-containing monomer which is used in the present invention, for example, an α,β-ethylenically unsaturated monocarboxylic acid monomer, α,β-ethylenically unsaturated polyvalent carboxylic acid monomer, α,β-ethylenically unsaturated dicarboxylic acid monoester monomer, etc. may be mentioned. Further, the carboxyl group-containing monomers also includes a monomer in which the carboxyl groups of these monomers form carboxylates. Furthermore, an anhydride of an α,β-ethylenically unsaturated polyvalent carboxylic acid also causes the acid anhydride groups to cleave apart after copolymerization to form carboxyl groups, so can be used as a carboxyl group-containing monomers.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, fumaric acid, maleic acid and other butenedioic acid, itaconic acid, citraconic acid, mesaconic acid, glutaconic acid, allylmalonic acid, teraconic acid, etc. may be mentioned. Further, as the anhydride of an α,β-unsaturated polyvalent carboxylic acid, maleic anhydride, itaconic anhydride, citraconic anhydride, etc. may be mentioned.

As the α,β-ethylenically unsaturated dicarboxylic acid monoester monomer, monomethyl maleate, monoethyl maleate, monopropyl maleate, mono n-butyl maleate, and other maleic acid monoalkyl esters; monocyclopentyl maleate, monocyclohexyl maleate, monocycloheptyl maleate, and other maleic acid monocycloalkyl esters; monomethylcyclopentyl maleate, monoethylcyclohexyl maleate, and other maleic acid monoalkylcycloalkyl esters; monomethyl fumarate, monoethyl fumarate, monopropyl fumarate, mono n-butyl fumarate, and other fumaric acid monoalkyl esters; monocyclopentyl fumarate, monocyclohexyl fumarate, monocycloheptyl fumarate, and other fumaric acid monocycloalkyl esters; monomethylcyclopentyl fumarate, monoethylcyclohexyl fumarate, and other fumaric acid monoalkylcycloalkyl esters; monomethyl citraconate, monoethyl citraconate, monopropyl citraconate, mono n-butyl citraconate, and other citraconic acid monoalkyl esters; monocyclopentyl citraconate, monocyclohexyl citraconate, monocycloheptyl citraconate, and other citraconic acid monocycloalkyl esters; monomethylcyclopentyl citraconate, monoethylcyclohexyl citraconate, and other citraconic acid monoalkylcycloalkyl esters; monomethyl itaconate, monoethyl itaconate, monopropyl itaconate, mono n-butyl itaconate, and other itaconic acid monoalkyl esters; monocyclopentyl itaconate, monocyclohexyl itaconate, monocycloheptyl itaconate, and other itaconic acid monocycloalkyl esters; monomethylcyclopentyl itaconate, monoethylcyclohexyl itaconate, and other itaconic acid monoalkylcycloalkyl esters; etc. may be mentioned.

The carboxyl group-containing monomer may be used as a single type alone or a plurality of types combined. Among these as well, since the effect of the present invention becomes more remarkable, an α,β-ethylenically unsaturated dicarboxylic acid monoester monomer is preferable, a maleic acid monoalkyl ester is more preferable, and mono-n-butyl maleate is particularly preferable. Note that, as the number of carbon atoms of the alkyl groups of the alkyl ester, 2 to 8 is preferable.

The content of the carboxyl group-containing monomer units is preferably 0.1 to 20 wt % with respect to the total monomer units, more preferably 0.2 to 15 wt %, furthermore preferably 0.5 to 10 wt %. If the content of the carboxyl group-containing monomer units is too small, the obtained cross-linked rubber is liable to fall in compression set resistance. On the other hand, if too large, the rubber composition is liable to deteriorate in scorch stability or the obtained cross-linked rubber is liable to fall in fatigue resistance.

Further, the carboxyl group-containing nitrile rubber (A) which is used in the present invention preferably also contains conjugated diene monomer units so that the obtained cross-linked product has rubbery elasticity.

As the conjugated diene monomer which forms the conjugated diene monomer units, 1,3-butadiene, isoprene, 2,3-dimethyl-1,3-butadiene, 1,3-pentadiene, chloroprene, and other conjugated diene monomers containing 4 to 6 carbon atoms are preferable, 1,3-butadiene and isoprene are more preferable, and 1,3-butadiene is particularly preferable. The conjugated diene monomer may be used as a single type alone or a plurality of types combined.

The content of the conjugated diene monomer units (including hydrogenated parts) is preferably 20 to 89.9 wt % with respect to the total monomer units, more preferably 30 to 89.8 wt %, furthermore preferably 30 to 74.5 wt %. If the content of the conjugated diene monomer units is too small, the obtained cross-linked rubber is liable to drop in rubbery elasticity, while conversely if too large, the heat resistance or chemical resistance stability may be impaired.

Further, the carboxyl group-containing nitrile rubber (A) which is used in the present invention may contain, in addition to the above-mentioned α,β-ethylenically unsaturated nitrile monomer units, carboxyl group-containing monomer units, and conjugated diene monomer units, further α,β-ethylenically unsaturated monocarboxylic acid ester monomer units.

As the α,β-ethylenically unsaturated monocarboxylic acid ester monomer which forms the α,β-ethylenically unsaturated monocarboxylic acid ester monomer units, methyl acrylate, ethyl acrylate, n-butyl acrylate, isobutyl acrylate, n-dodecyl acrylate, methyl methacrylate, ethyl methacrylate, or other (meth)acrylic acid esters (abbreviation of "methacrylic acid ester and acrylic acid ester", same below) which have alkyl groups with 1 to 18 carbon atoms; methoxymethyl acrylate, ethoxypropyl acrylate, methoxybutyl acrylate, ethoxydodecyl acrylate, methoxyethyl methacrylate, methoxybutyl methacrylate, ethoxypentyl methacrylate, or other (meth)acrylic acid esters which have alkoxyalkyl groups with 2 to 12 carbon atoms; α-cyanoethyl acrylate, α-cyanoethyl methacrylate, cyanobutyl methacrylate, or other (meth)acrylic acid esters which have cyanoalkyl groups with 2 to 12 carbon atoms; 2-hydroxyethyl acrylate, 2-hydroxypropyl acrylate, 2-hydroxyethyl methacrylate, or other (meth)acrylic acid esters which have hydroxyalkyl groups with 1 to 12 carbon atoms; trifluoroethyl acrylate, tetrafluoropropyl methacrylate, or other (meth)acrylic acid esters which have fluoroalkyl groups with 1 to 12 carbon atoms; etc. may be mentioned, but from the viewpoint of improvement of the cold resistance and compression set resistance, (meth)acrylic acid esters which have alkyl groups with 1 to 18 carbon atoms and (meth)acrylic acid esters which have alkoxyalkyl groups with 2 to 18 carbon atoms are preferable, (meth)acrylic acid esters which have alkyl groups with 1 to 10 carbon atoms and (meth) acrylic acid esters which have alkoxyalkyl groups with 2 to 10 carbon atoms are more preferable, and n-butyl acrylate and methoxyethyl acrylate are particularly preferable. These may be used as single type alones or a plurality of types combined.

The content of the $\alpha,\beta$-ethylenically unsaturated monocarboxylic acid ester monomer units is preferably 0 to 50 wt % with respect to the total monomer units, more preferably 0 to 45 wt %, furthermore preferably 10 to 45 wt %.

Further, the carboxyl group-containing nitrile rubber (A) which is used in the present invention may be one obtained by copolymerizing together with a $\alpha,\beta$-ethylenically unsaturated nitrile monomer, carboxyl group-containing monomer, $\alpha,\beta$-ethylenically unsaturated monocarboxylic acid ester monomer, and conjugated diene monomer, other monomers which can be copolymerized with these. As such other monomers, ethylene, $\alpha$-olefin monomer, aromatic vinyl monomer, fluorine-containing vinyl monomer, etc. may be illustrated.

As the $\alpha$-olefin monomer, one with 3 to 12 carbon atoms is preferable. For example, propylene, 1-butene, 4-methyl-1-pentene, 1-hexene, 1-octene, etc. may be mentioned.

As the aromatic vinyl monomer, for example, styrene, $\alpha$-methylstyrene, vinyl pyridine, etc. may be mentioned.

As the fluorine-containing vinyl monomer, for example, fluoroethylvinyl ether, fluoropropylvinyl ether, o-trifluoromethylstyrene, vinyl pentafluorobenzoate, difluoroethylene, tetrafluoroethylene, etc. may be mentioned.

The other copolymerizable monomers may be jointly used in a plurality of types. The content of the units of other monomers is preferably 50 wt % or less with respect to the total monomer units, more preferably 30 wt % or less, furthermore preferably 10 wt % or less.

The carboxyl group-containing nitrile rubber (A) has an iodine value of 120 or less, preferably 60 or less, more preferably 40 or less, particularly preferably 30 or less. If the carboxyl group-containing nitrile rubber (A) has too high an iodine value, the obtained cross-linked product is liable to fall in heat resistance and ozone resistance.

The carboxyl group-containing nitrile rubber (A) has a polymer Mooney viscosity ($ML_{1+4}$, 100° C.) of preferably 10 to 200, more preferably 15 to 150, furthermore preferably 15 to 100, particularly preferably 30 to 70. If the carboxyl group-containing nitrile rubber (A) has too low a polymer Mooney viscosity, the obtained cross-linked rubber is liable to fall in mechanical properties, while conversely if too high, the cross-linkable rubber composition may fall in processability.

Further, the carboxyl group-containing nitrile rubber (A) has a content of the carboxyl groups, that is, number of moles of the carboxyl group per 100 g of the carboxyl group-containing nitrile rubber (A), of preferably $5\times10^{-4}$ to $5\times10^{-1}$ ephr, more preferably $1\times10^{-3}$ to $1\times10^{-1}$ ephr, particularly preferably $5\times10^{-3}$ to $6\times10^{-2}$ ephr. If the carboxyl group-containing nitrile rubber (A) has too small a carboxyl group content, the obtained cross-linked product is liable to fall in mechanical strength, while if too large, it may fall in cold resistance.

The method of production of the carboxyl group-containing nitrile rubber (A) of the present invention is not particularly limited, but it is preferable to use emulsion polymerization using an emulsifying agent to copolymerize the above monomers to prepare a latex of copolymer rubber and hydrogenate this. At the time of emulsion polymerization, an emulsifying agent, polymerization initiator, molecular weight adjuster, or other usually used secondary polymerization material may be used.

The emulsifying agent is not particularly limited, but, for example, polyoxyethylenealkyl ether, polyoxyethylenealkylphenol ether, polyoxyethylenealkyl ester, polyoxyethylenesorbitanalkyl ester, and other nonionic emulsifying agent; a salt of myristic acid, palmitic acid, oleic acid, linoleic acid, and other fatty acid, sodium dodecylbenzene sulfonate and other alkylbenzene sulfonate, higher alcohol sulfuric ester salt, alkyl sulfosuccinic acid salt, and other anionic emulsifying agent; sulfoester of $\alpha,\beta$-unsaturated carboxylic acid, sulfate ester of $\alpha,\beta$-unsaturated carboxylic acid, sulfoalkyl arylether, and other copolymerizable emulsifying agent; etc. may be mentioned. The amount of use of the emulsifying agent is preferably 0.1 to 10 parts by weight with respect to 100 parts by weight of the total monomers.

The polymerization initiator is not particularly limited if a radical initiator, but potassium persulfate, sodium persulfate, ammonium persulfate, potassium perphosphate, hydrogen peroxide, and other inorganic peroxides; t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, t-butyl peroxyisobutyrate, and other organic peroxides; azobisisobutyronitrile, azobis-2,4-dimethyl valeronitrile, azobiscyclohexane carbonitrile, methyl azobisisobutyrate, and other azo compounds; etc. may be mentioned. The polymerization initiator may be used alone or as two types or more combined. As the polymerization initiator, an inorganic or organic peroxide is preferable. When using the peroxide as the polymerization initiator, it may be combined with sodium hydrogen sulfite, ferrous sulfate, and other reducing agents for use as a redox-based polymerization initiator. The amount of use of the polymerization initiator is preferably 0.01 to 2 parts by weight with respect to 100 parts by weight of the total monomers.

The molecular weight adjuster is not particularly limited, but t-dodecyl mercaptan, n-dodecyl mercaptan, octyl mercaptan, and other mercaptans; carbon tetrachloride, methylene chloride, methylene bromide, and other halogenated hydrocarbon; $\alpha$-methylstyrene dimer; tetraethylthiuram disulfide, dipentamethylene thiuram disulfide, diisopropyl xantogen disulfide, and other sulfur-containing compounds etc. may be mentioned. These may be used alone or in two or more types combined. Among these as well, mercaptans are preferable, and t-dodecyl mercaptan is more preferable. The amount of use of the molecular weight adjuster is preferably 0.1 to 2 parts by weight with respect to 100 parts by weight of the total monomers.

For the medium of the emulsion polymerization, usually, water is used. The amount of water is preferably 80 to 500 parts by weight with respect to 100 parts by weight of the total monomers.

At the time of emulsion polymerization, further, in accordance with need, a stabilizer, dispersant, pH adjuster, deoxidant, particle size adjuster, and other secondary polymerization material may be used. In the case of using these, the types and amounts of use are also not particularly limited.

Further, by selectively hydrogenating the double bonds of the conjugated diene monomer units of the obtained copolymer, it is possible to produce a carboxyl group-containing nitrile rubber (A). Note that, the type and amount of the hydrogenation catalyst which is used for the hydrogenation, the hydrogenation temperature, etc. may be determined based on known methods.

Polyamine Cross-Linking Agent (B)

The cross-linkable rubber composition of the present invention contains a polyamine cross-linking agent (B). By using a cross-linking agent constituted by the polyamine cross-linking agent (B), the obtained cross-linked rubber is improved in compression set resistance.

The polyamine cross-linking agent (B) which is used in the present invention is not particularly limited so long as a compound having two or more amino groups or a compound of a form having two or more amino groups at the time of cross-linking, but a compound of an aliphatic hydrocarbon or aromatic hydrocarbon with its plurality of hydrogen atoms substituted by amino groups or hydrazide structures (structures expressed by $-CONHNH_2$, where CO indicates a carbonyl group) and a compound of a form which becomes that at the time of cross-linking are preferable. As specific examples, hexamethylenediamine, hexamethylenediamine carbamate, dodecamethylenediamine, tetramethylenepentamine, hexamethylenediamine-cinnamaldehyde adduct, hexamethylenediamine dibenzoate salt, or other aliphatic polyvalent amines; 2,2-bis{4-(4-aminophenoxyl)phenyl}propane, 4,4'-methylenedianiline, m-phenylenediamine, p-phenylenediamine, 4,4'-methylenebis(o-chloroaniline), or other aromatic polyvalent amines; dihydrazide isophthalate, dihydrazide adipate, dihydrazide sebacate, or other compound which has two or more hydrazide structures; etc. may be mentioned. Among these as well, dodecamethylenediamine and hexamethylenediamine carbamate are preferable, while hexamethylenediamine carbamate is particularly preferable.

In the cross-linkable rubber composition of the present invention, the amount of the polyamine cross-linking agent (B) is preferably 0.1 to 20 parts by weight with respect to 100 parts by weight of the carboxyl group-containing nitrile rubber (A), more preferably 0.2 to 15 parts by weight, furthermore preferably 0.5 to 10 parts by weight. If the amount of the polyamine cross-linking agent (B) is too small, the obtained cross-linked rubber is liable to deteriorate in mechanical properties and compression set resistance. On the other hand, if too large, the obtained cross-linked rubber tends to deteriorate in fatigue resistance.

Basic Cross-Linking Accelerator (C)

The cross-linkable rubber composition of the present invention contains the basic cross-linking accelerator (C) which is expressed by the following general formula (1).

$$R^1-NH-R^2 \qquad (1)$$

(Where in the general formula (1), $R^1$ and $R^2$ respectively independently are alkyl groups containing 1 to 12 carbon atoms which may have substituents or cycloalkyl groups containing 5 to 12 carbon atoms which may have substituents.)

$R^1$ and $R^2$ are alkyl groups containing 1 to 12 carbon atoms which may have substituents or cycloalkyl groups containing 5 to 12 carbon atoms which may have substituents, but preferably are cycloalkyl groups containing 5 to 12 carbon atoms which may have substituents, more preferably are cycloalkyl groups containing 5 to 8 carbon atoms which may have substituents. Further, $R^1$ and $R^2$ preferably do not have substituents.

Note that, as specific examples of substituents when $R^1$ and $R^2$ have substituents, a hydroxyl group, alkoxy group, alkoxycarbonyl group, amino group, halogen atom, etc. may be mentioned.

Further, the basic cross-linking accelerator (C) is preferably one which is expressed by the following general formula (2) since the effect of the present invention becomes much more remarkable.

$$R^3-NH-R^4 \qquad (2)$$

(Where in general formula (2), $R^3$ and $R^4$ are, respectively independently, cycloalkyl groups containing 5 to 8 carbon atoms.)

$R^3$ and $R^4$ are cycloalkyl groups containing 5 to 8 carbon atoms, but preferably are cycloalkyl groups containing 5 to 6 carbon atoms, more preferably are cycloalkyl groups containing 6 carbon atoms. Further, $R^3$ and $R^4$ preferably do not have substituents.

Note that, as specific examples of substituents when $R^3$ and $R^4$ have substituents, a hydroxyl group, alkoxy group, alkoxycarbonyl group, amino group, halogen atom, etc. may be mentioned.

As specific examples of the basic cross-linking accelerator (C), dicyclopentylamine, dicyclohexylamine, dicycloheptylamine, or other dicycloalkylamine; N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylcyclooctylamine, or other secondary amine with an alkyl group and a cycloalkyl group bonding to a nitrogen atom; N-hydroxymethylcyclopentylamine, N-hydroxybutylcyclohexylamine, or other secondary amine with an alkyl group and cycloalkyl group which have a hydroxyl group and bond to a nitrogen atom; N-methoxyethylcyclopentylamine, N-ethoxybutylcyclohexylamine, or other secondary amine with an alkyl group and cycloalkyl group which have an alkoxyl group and bond to a nitrogen atom; N-methoxycarbonylbutylcyclopentylamine, N-methoxycarbonylheptylcyclohexylamine, or other secondary amine with an alkyl group and cycloalkyl group which have an alkoxycarbonyl group and bond to a nitrogen atom; N-aminopropylcyclopentylamine, N-aminoheptylcyclohexylamine, or other secondary amine with an alkyl group and cycloalkyl group which have an amino group and bond to a nitrogen atom; di(2-chlorocyclopentyl)amine, di(3-chlorocyclopentyl)amine, or other secondary amine with a cycloalkyl group which has a halogen atom and bonds to a nitrogen atom; etc. may be mentioned, but since the effect of the present invention becomes much more remarkable, dicycloalkylamine is preferable, dicyclopentylamine and dicyclohexylamine are more preferable, and dicyclohexylamine is particularly preferable.

In the cross-linkable rubber composition of the present invention, the amount of the basic cross-linking accelerator (C) is preferably 0.1 to 20 parts by weight with respect to 100 parts by weight of the carboxyl group-containing nitrile rubber (A), more preferably 0.5 to 10 parts by weight, furthermore preferably 1 to 5 parts by weight. If the amount of the basic cross-linking accelerator (C) is in the above range, the effect of the present invention becomes much more remarkable.

Further, the cross-linkable rubber composition of the present invention may further contain a basic cross-linking accelerator other than the basic cross-linking accelerator (C).

As specific examples of the basic cross-linking accelerator other than the basic cross-linking accelerator (C), 1,8-diazabicyclo[5,4,0]undecene-7 (below, sometimes abbreviated as "DBU") and 1,5-diazabicyclo[4,3,0]nonene-5 (below, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methylphenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, or other basic cross-linking accelerator having a cyclic amidine structure; tetramethylguanidine, tetraethylguanidine, diphenylguanidine, 1,3-di-o-tolylguanidine, o-tolylbiguanide, or other guanidine-based basic cross-linking accelerator; n-butylaldehyde aniline, acetoaldehyde ammonia, or other aldehyde amine-based basic cross-linking accelerator; etc. may be mentioned.

In the cross-linkable rubber composition of the present invention, the amount of the basic cross-linking accelerator other than the basic cross-linking accelerator (C) is preferably 0 to 10 parts by weight with respect to 100 parts by weight of the carboxyl group-containing nitrile rubber (A), more preferably 0 to 5 parts by weight.

Alkyleneglycol

The cross-linkable rubber composition of the present invention preferably further contains alkyleneglycol since the effect of the present invention becomes much more remarkable.

Further, alkyleneglycol preferably forms a salt with the above-mentioned basic cross-linking accelerator (C). In this case, in accordance with need, an inorganic acid and/or organic acid may be used. The alkyleneglycol may be made a form which can form a salt with the above-mentioned basic cross-linking accelerator (C) together with an inorganic acid and/or organic acid. In this case, the form of the salt is not particularly limited, but, for example, (i) a form by which the alkyleneglycol and the above-mentioned basic cross-linking accelerator (C) form a salt, (ii) a form by which the alkyleneglycol and the above-mentioned basic cross-linking accelerator (C) form a salt and the salt is physically mixed with an inorganic acid and/or organic acid, (iii) a form by which the basic cross-linking accelerator (C) and inorganic acid and/or organic acid form a salt and the salt is physically mixed with alkyleneglycol, (iv) a form by which alkyleneglycol, the basic cross-linking accelerator (C), and an inorganic acid and/or organic acid form a three-ingredient system salt, etc. may be mentioned.

As the alkyleneglycol, ethyleneglycol, propyleneglycol, 2,3-butanediol, or other alkyleneglycol containing 2 to 6 carbon atoms is preferable, an alkyleneglycol containing 2 to 3 carbon atoms is more preferable, and ethyleneglycol is particularly preferable.

As specific examples of the inorganic acid, hydrofluoric acid, hydrochloric acid, bromic acid, iodic acid, sulfuric acid, nitric acid, carbonic acid, phosphoric acid, etc. may be mentioned, while as specific examples of the organic acid, formic acid, acetic acid, propionic acid, butyric acid, isobutyric acid, oxalic acid, malonic acid, adipic acid, etc. may be mentioned.

In the cross-linkable rubber composition of the present invention, the content of the alkylene glycol is preferably 0 to 20 parts by weight with respect to 100 parts by weight of the carboxyl group-containing nitrile rubber (A), more preferably 0.1 to 10 parts by weight, particularly preferably 0.2 to 5 parts by weight.

Alkyl Alcohol Containing 5 to 20 Carbon Atoms

The cross-linkable rubber composition of the present invention preferably further contains alkyl alcohol containing 5 to 20 carbon atoms since the effect of the present invention becomes much more remarkable.

In this case, the above-mentioned alkyleneglycol preferably forms a salt with the basic cross-linking accelerator (C), in accordance with need, together with an inorganic acid and/or organic acid, and is added to the carboxyl group-containing nitrile rubber (A) in a state of this salt mixed with alkyl alcohol containing 5 to 20 carbon atoms.

As the alkyl alcohol containing 5 to 20 carbon atoms, 1-pentanol, 1-heptanol, 1-decanol, 1-tetradecanol, 1-hexadecanol, 1-octadecanol, or other linear alcohol which has a hydroxyl group at its end; 2-pentanol, 3-heptanol, 4-decanol, 6-tetradecanol, 5-hexadecanol, 7-octadecanol, or other linear alcohol which has a hydroxyl group at a carbon atom other than a carbon atom positioned at the end; 2-hydroxy-4-ethyl-hexanol, 3-hydroxy-5-butyl-decanol, or other branched alcohol; etc. may be mentioned, but from the viewpoint of the dispersability of the basic cross-linking accelerator (C), a linear alcohol containing 5 to 20 carbon atoms which has hydroxyl groups at its end is preferable, linear alcohol containing 10 to 20 carbon atoms which has hydroxyl groups at its end is more preferable, and 1-tetradecanol, 1-hexadecanol, and 1-octadecanol are furthermore preferable.

In the cross-linkable rubber composition of the present invention, the content of the alkyl alcohol containing 5 to 20 carbon atoms is preferably 0 to 10 parts by weight with respect to 100 parts by weight of the carboxyl group-containing nitrile rubber (A), more preferably 0.1 to 5 parts by weight, particularly preferably 0.2 to 2 parts by weight.

Further, the cross-linkable rubber composition of the present invention may have blended into it, in addition to the above, other compounding agents which are usually used in the field of rubber, for example, carbon black or silica or other reinforcing filler, calcium carbonate or clay or other nonreinforcing filler, cross-linking accelerator other than the basic cross-linking accelerator, cross-linking aid, cross-linking retardant, antiaging agent, antioxidant, photostabilizer, primary amine or other scorch preventer, silane coupling agent, plasticizer, processing aid, slip agent, tackifier, lubricant, flame retardant, antifungal agent, antistatic agent, pigment, etc. The amounts of these compounding agents are not particularly limited so long as in the range not detracting from the object and effects of the present invention. Amounts according to the purposes of inclusion may be suitably employed.

The cross-linkable rubber composition of the present invention may have another polymer other than the above-mentioned carboxyl group-containing nitrile rubber (A) mixed into it in a range not detracting from the effect of the present invention. As the other polymer, acrylic rubber, ethylene-acrylic acid copolymer rubber, fluororubber, styrene-butadiene copolymer rubber, ethylene-propylene copolymer rubber, ethylene-propylene-diene ternary copolymer rubber, natural rubber, polyisoprene rubber, etc. may be mentioned. When mixing in this other polymer, the amount of the cross-linkable rubber composition is preferably 30 parts by weight or less with respect to 100 parts by weight of the carboxyl group-containing nitrile rubber (A), more preferably 20 parts by weight or less, furthermore preferably 10 parts by weight or less.

Preparation of Cross-Linkable Rubber Composition

The method of preparation of the cross-linkable rubber composition of the present invention is not particularly limited, but the method of mixing the carboxyl group-containing nitrile rubber (A), polyamine cross-linking agent (B), and basic cross-linking accelerator (C) may be mentioned. Note that, in this case, the basic cross-linking accelerator (C) preferably forms a salt with the above-mentioned alkylene glycol together with, in accordance with need, an inorganic acid and/or organic acid and is used in a state of this salt mixed with alkyl alcohol containing 5 to 20 carbon atoms.

The mixing method is not particularly limited, but mixing in a nonaqueous system (dry blending) is preferable.

Specifically, when mixing the carboxyl group-containing nitrile rubber (A), polyamine cross-linking agent (B), and basic cross-linking accelerator (C), the ingredients other than the polyamine cross-linking agent (B), basic cross-linking accelerator (C), heat-unstable cross-linking aid, etc. are added and kneaded at, preferably, 10 to 200° C., more preferably 20 to 170° C., in a Bambury mixer, Brabender mixer, internal mixer, kneader, or other mixing machine, then are transferred to a roll etc. where the polyamine cross-linking agent (B), basic cross-linking accelerator (C), and heat-unstable cross-linking aid, etc. are added and preferably secondarily kneaded under conditions of 10 to 80° C.

Note that, when kneading by a mixing machine, carbon black, silica, antiaging agent, or various other compounding agents or other rubber may be simultaneously mixed.

The thus obtained cross-linkable rubber composition of the present invention has a compound Mooney viscosity [$ML_{1+4}$, 100° C.] of preferably 10 to 200, more preferably 15 to 180, furthermore preferably 20 to 150, and is excellent in processability.

Cross-Linked Rubber

The cross-linked rubber of the present invention is obtained by cross-linking the above-mentioned cross-linkable rubber composition of the present invention.

The cross-linked rubber of the present invention may be produced by using the cross-linkable rubber composition of the present invention, shaping it by using, for example, a molding machine corresponding to the desired shape such as an extruder, injection molding machine, compressor, roll, etc., heating it to perform a cross-linking reaction, and fixing the shape as a cross-linked product. In this case, it is possible to perform the cross-linking after the preliminary shaping or perform the cross-linking simultaneously with the shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 5 hours.

Further, depending on the shape, size, etc. of the cross-linked rubber, sometimes even if the surface is cross-linked, the inside will not be sufficiently cross-linked, so the rubber may be further heated for secondary cross-linking.

As the heating method, press heating, steam heating, oven heating, hot air heating, and other general methods which are used for cross-linking rubber may be suitably selected.

The thus obtained cross-linked rubber of the present invention is excellent in compression set resistance in addition to the properties inherent to nitrile rubber which is excellent in oil resistance, mechanical properties, etc.

For this reason, the cross-linked rubber of the present invention can be used for O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), bladders, and other various seal members; intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, top cover use gaskets for hard disk drives, and other various types of gaskets; printing use rolls, ironmaking use rolls, papermaking use rolls, industrial use rolls, office equipment use rolls, and other various types of rolls; flat belts (film core flat belts, cogged flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, cogged V-ribbed belts, etc.), CVT use belts, timing belts, toothed belt, conveyor belts, oil immersed belts, and other various types of belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flow lines, and other various types of hoses; CVJ boots, propeller shaft boots, constant velocity joint boots, rack and pinion boots, and other various types of boots; cushion materials, dynamic dampers, rubber couplings, air springs, shock absorbers, and other attenuating member rubber parts; dust covers, automotive interior members, tires, covered cables, shoe soles, electromagnetic wave shields, binders for flexible printed circuits boards or other binders, fuel cell separators and also other broad applications in the fields of cosmetics and pharmaceuticals, fields in contact with food, the electronics field, etc.

Among these as well, the cross-linked rubber of the present invention can be suitably used for seal members, gaskets, belts, or hoses and can be particularly suitably used for seal members.

EXAMPLES

Below, examples and comparative examples will be given to specifically explain the present invention. Below, unless otherwise indicated, "parts" are based on weight. Note that the tests and evaluations were conducted as follows.

Iodine Value

The nitrile rubber was measured for iodine value in accordance with JIS K 6235.

Carboxyl-Group Content

To 2 mm square nitrile rubber 0.2 g, 2-butanone 100 ml was added and stirred for 16 hours, then ethanol 20 ml and water 10 ml were added and, while stirring, a 0.02N hydrous ethanol solution of potassium hydroxide was used for titration at room temperature by Thymolphthalein as an indicator to thereby find the number of moles of the carboxyl groups for the nitrile rubber 100 g (units: ephr).

Composition of Nitrile Rubber

The ratios of content of the monomer units which form the carboxyl group-containing nitrile rubber after hydrogenation were measured by the following method.

That is, the ratio of content of the mono-n-butyl maleate units was calculated by using the method of measurement of the above "carboxyl-group content" so as to find the number of moles of the carboxyl group with respect to 100 g of the carboxyl group-containing nitrile rubber after hydrogenation and converting the number of moles which were found to the amount of mono-n-butyl maleate units.

The ratio of content of 1,3-butadiene units (including hydrogenated parts) was calculated by measuring the iodine value of the carboxyl group-containing nitrile rubber before the hydrogenation reaction by the above method.

The ratio of content of the acrylonitrile units was calculated by measuring the nitrogen content in the carboxyl group-containing nitrile rubber after hydrogenation by the Kjeldahl method in accordance with JIS K6383.

The ratios of content of the n-butyl acrylate units and methoxyethyl acrylate units were found by calculation from the found ratios of content of mono-n-butyl maleate units, 1,3-butadiene units, and, acrylonitrile units.

Mooney Viscosity (Polymer Mooney)

The nitrile rubber was measured for Mooney viscosity (Polymer Mooney) in accordance with JIS K6300 (units: [$ML_{1+4}$, 100° C.]).

Normal Physical Properties (Tensile Strength, Tensile Stress, Elongation, and Hardness)

Using a vertical 15 cm, horizontal 15 cm, depth 0.2 cm mold, the cross-linkable rubber composition was pressed by a press pressure of 10 MPa while heating at 170° C. for 20 minutes for press forming to obtain a sheet-shaped cross-linked product. Next, the obtained cross-linked product was transferred to a gear type oven where it was secondarily cross-linked at 170° C. for 4 hours. The obtained sheet-shaped cross-linked rubber was punched to No. 3 type dumbbell shapes to prepare test pieces. Further, the obtained test pieces were used in accordance with JIS K6251 to measure the cross-linked rubber for tensile strength, 100% tensile stress, and elongation and further in accordance with JIS K6253 using a Durometer hardness tester (type A) to measure the cross-linked rubber for hardness.

Compression Set (Disk Compression Set)

Using an inside diameter 29 mm, depth 12.5 mm mold, the cross-linkable rubber composition was cross-linked at a temperature 170° C. at a press pressure of 10 MPa for 20 minutes to obtain columnar cross-linked rubber. Next, obtained cross-linked rubber was heated in a gear type oven further under conditions of 150° C. for 20 hours to cause secondary cross-linking and thereby obtain a columnar test piece. Further, the obtained test piece was used and allowed to stand in a 150° C. environment for 72 hours in the state with the test piece compressed 25% in accordance with JIS K6262, then the compression set (disk compression set) was measured. The smaller this value, the better the compression set resistance.

Compression Set (O-Ring Compression Set)

Using an inside diameter 30 mm, ring diameter 3 mm mold, the cross-linkable rubber composition was cross-linked at 170° C. for 20 minutes under a press pressure of 5 MPa and was secondarily cross-linked at 150° C. for 20 hours to obtain an O-ring test piece. Further, the obtained O-ring shaped test piece was used to measure the compression set (O-ring compression set) in accordance with JIS K6262 under conditions held at 150° C. for 72 hours in the state with the distance between two flat plates which sandwich the O-ring shaped test piece compressed 25% in the ring thickness direction. The smaller this value, the better the compression set resistance.

Production Example 1

Production of Carboxyl Group-Containing Nitrile Rubber (a1))

To a reactor, ion exchanged water 220 parts, concentration 10% sodium dodecylbenzene sulfonate aqueous solution 5 parts, acrylonitrile 37 parts, mono n-butyl maleate 4 parts, and t-dodecyl mercaptan (molecular weight adjuster) 0.75 part were successively charged. The inside gas was replaced with nitrogen three times, then 1,3-butadiene 57 parts was charged. Further, the reactor was held at 10° C., then cumen hydroperoxide (polymerization initiator) 0.06 part was charged. While stirring, the polymerization reaction was continued. At the points of time when the polymerization conversion rate reached 40% and 60%, 1 parts of mono-n-butyl maleate were added respectively. When the polymerization converstion rate reached 85%, concentration 10 wt % hydroquinone aqueous solution (polymerization terminator) 0.1 part was added to stop the polymerization reaction. Next, the residual monomers were removed at a water temperature of 60° C. to obtain a latex of nitrile rubber (X1) (solid content concentration: 30 wt %).

Further, the above obtained latex of the nitrile rubber (X1) and a palladium catalyst (solution of mixture of 1 wt % palladium acetate acetone solution and equal weight of ion exchanged water) were added to the autoclave to give a palladium content of 1000 ppm with respect to the dry weight of rubber which is contained in the latex of the nitrile rubber (X1) and a hydrogenation reaction was performed by a hydrogen pressure of 3 MPa and temperature of 50° C. for 6 hours to obtain a latex of the carboxyl group-containing nitrile rubber (a1).

To the obtained latex of carboxyl group-containing nitrile rubber (a1), two volumes of methanol were added to coagulate it, then the result was vacuum dried at 60° C. for 12 hours to obtain the carboxyl group-containing nitrile rubber (a1). The obtained carboxyl group-containing nitrile rubber (a1) had a carboxyl-group content of 0.030 ephr, iodine value of 9, and polymer Mooney viscosity [$ML_{1+4}$, 100° C.] of 44. Further, the obtained carboxyl group-containing nitrile rubber (a1) comprised acrylonitrile units 35.7 wt %, butadiene units (including hydrogenated parts) 58.6 wt %, and mono-n-butyl maleate units 5.7 wt %.

Production Example 2

Production of Carboxyl Group-Containing Nitrile Rubber (a2)

To a reactor, ion exchanged water 220 parts, concentration 10% sodium dodecylbenzene sulfonate aqueous solution 5 parts, acrylonitrile 17.2 parts, mono n-butyl maleate 3.3 parts, n-butyl acrylate 35.2 parts, and t-dodecyl mercaptan (molecular weight adjuster) 0.53 part were successively charged. The inside gas was replaced with nitrogen three times, then 1,3-butadiene 26.2 parts was charged. Further, the reactor was held at 10° C., then cumen hydroperoxide (polymerization initiator) 0.06 part was charged. While stirring, the polymerization reaction was continued. At the point of time when the polymerization conversion rate reached 40%, mono-n-butyl maleate 0.85 part, acrylonitrile 1.6 part, and 1,3-butadiene 6.6 parts were added, next, at the point of time when the polymerization conversion rate reached 70%, mono-n-butyl maleate 0.85 part, acrylonitrile 1.6 parts, 1,3-butadiene 6.6 parts, t-dodecylmercaptan (molecular weight adjuster) 0.15 part and cumen hydroperoxide (polymerization initiator) 0.03 part were added and, when the polymerization conversion rate reached 85%, concentration 10 wt % hydroquinone aqueous solution (polymerization terminator) 0.1 part was added to stop the polymerization reaction. Next, the residual monomers were removed at a water temperature of 60° C. to obtain a latex of nitrile rubber (X2) (solid content concentration: 30 wt %).

Further, the above obtained latex of the nitrile rubber (X2) and a palladium catalyst (solution of mixture of 1 wt % palladium acetate acetone solution and equal weight of ion exchanged water) were added to the autoclave to give a palladium content of 1000 ppm with respect to the dry weight of rubber which is contained in the latex of the nitrile rubber (X2) and a hydrogenation reaction was performed by a hydrogen pressure of 3 MPa and temperature of 50° C. for 6 hours to obtain a latex of the carboxyl group-containing nitrile rubber (a2).

To the obtained latex of carboxyl group-containing nitrile rubber (a2), two volumes of methanol were added to coagulate it, then the result was vacuum dried at 60° C. for 12 hours to obtain the carboxyl group-containing nitrile rubber (a2). The obtained carboxyl group-containing nitrile rubber (a2) had a carboxyl-group content of 0.024 ephr, iodine value of 10, and polymer Mooney viscosity [$ML_{1+4}$, 100° C.] of 35. Further, the obtained carboxyl group-containing nitrile rubber (a2) comprised acrylonitrile units 21 wt %, butadiene units (including hydrogenated parts) 43.3 wt %, mono-n-butyl maleate units 5.7 wt %, and n-butyl acrylate units 30 wt %.

Production Example 3

Production of Carboxyl Group-Containing Nitrile Rubber (a3)

To a reactor, ion exchanged water 180 parts, concentration 10% sodium dodecylbenzene sulfonate aqueous solution 25 parts, acrylonitrile 23 parts, mono n-butyl maleate 6.5 parts, methoxyethyl acrylate 30.5 parts, and t-dodecyl mercaptan (molecular weight adjuster) 0.65 part were successively charged. The inside gas was replaced with nitrogen three times, then 1,3-butadiene 40 parts was charged. Further, the reactor was held at 10° C., then cumen hydroperoxide (polymerization initiator) 0.06 part was charged. While stirring, the polymerization reaction was continued. At the point of time when the polymerization conversion rate reached 83%, concentration 10 wt % hydroquinone aqueous solution (polymerization terminator) 0.1 part was added to stop the polymerization reaction. Next, the residual monomers were removed at a water temperature of 60° C. to obtain a latex of nitrile rubber (X3) (solid content concentration: 30 wt %).

Further, the above obtained latex of the nitrile rubber (X3) and a palladium catalyst (solution of mixture of 1 wt % palladium acetate acetone solution and equal weight of ion exchanged water) were added to the autoclave to give a palladium content of 1000 ppm with respect to the dry weight of rubber which is contained in the latex of the nitrile rubber (X3) and a hydrogenation reaction was performed by a hydrogen pressure of 3 MPa and temperature of 50° C. for 6 hours to obtain a latex of the carboxyl group-containing nitrile rubber (a3).

To the obtained latex of carboxyl group-containing nitrile rubber (a3), two volumes of methanol were added to coagulate it, then the result was vacuum dried at 60° C. for 12 hours to obtain the carboxyl group-containing nitrile rubber (a3). The obtained carboxyl group-containing nitrile rubber (a3) had a carboxyl-group content of 0.034 ephr, iodine value of 9, and polymer Mooney viscosity [$ML_{1+4}$, 100° C.] of 41. Further, the obtained carboxyl group-containing nitrile rubber (a3) comprised acrylonitrile units 24 wt %, butadiene units (including hydrogenated parts) 46.6 wt %, mono-n-butyl maleate units 6.5 wt %, and methoxy ethyl acrylate units 22.9 wt %.

Production Example 4

Production of Carboxyl Group-Containing Nitrile Rubber (a4)

To a reactor, ion exchanged water 220 parts, concentration 10% sodium dodecylbenzene sulfonate aqueous solution: 5 parts, acrylonitril 50 parts, mono n-butyl maleate 6 parts, and t-dodecyl mercaptan (molecular weight adjuster) 1.05 part were successively charged. The inside gas was replaced with nitrogen three times, then 1,3-butadiene 26 parts was charged. Further, the reactor was held at 10° C., then cumen hydroperoxide (polymerization initiator) 0.06 part was charged. While stirring, the polymerization reaction was continued. At the point of time when the polymerization conversion rate reached 60%, 18 parts of 1,3-butadiene was added. At the point of time when the polymerization conversion rate reached 85%, concentration 10 wt % hydroquinone aqueous solution (polymerization terminator) 0.1 part was added to stop the polymerization reaction. Next, the residual monomers were removed at a water temperature of 60° C. to obtain a latex of nitrile rubber (X4) (solid content concentration: 30 wt %).

Further, the above obtained latex of the nitrile rubber (X4) and a palladium catalyst (solution of mixture of 1 wt % palladium acetate acetone solution and equal weight of ion exchanged water) were added to the autoclave to give a palladium content of 1000 ppm with respect to the dry weight of rubber which is contained in the latex of the nitrile rubber (X4) and a hydrogenation reaction was performed by a hydrogen pressure of 3 MPa and temperature of 50° C. for 6 hours to obtain a latex of the carboxyl group-containing nitrile rubber (a4).

To the obtained latex of carboxyl group-containing nitrile rubber (a4), two volumes of methanol were added to coagulate it, then the result was vacuum dried at 60° C. for 12 hours to obtain the carboxyl group-containing nitrile rubber (a4). The obtained carboxyl group-containing nitrile rubber (a4) had a carboxyl-group content of 0.025 ephr, iodine value of 9, and polymer Mooney viscosity [$ML_{1+4}$, 100° C.] of 38. Further, the obtained carboxyl group-containing nitrile rubber (a4) comprised acrylonitrile units 44.4 wt %, butadiene units (including hydrogenated parts) 49.5 wt %, and mono-n-butyl maleate units 6.1 wt %.

Example 1

A Bambury mixer was used to add and knead the carboxyl group-containing nitrile rubber (a1) which was obtained at Production Example 1, 100 parts, FEF carbon black (product name "Seast SO", made by Tokai Carbon) 40 parts, trimellitic acid ester (product name "Adekasizer C-8", made by Adeka, plasticizer) 5.3 parts, 4,4'-di-(α,α-dimethylbenzyl) diphenylamine (product name "Nocrac CD", made by Ouchi Shinko Chemical Industrial, antiaging agent) 1.6 parts, stearic acid (slip agent) 1 part, and polyoxyethylene alkylether phosphoric acid ester (product name "Phosphanol RL210", made by Toho Chemical Industry, processing aid) 1 part at 50° C. for 5 minutes. Next, the obtained mixture was transferred to rolls made a temperature 40° C. and kneaded with a mixture of a dicyclohexylamine salt of ethyleneglycol and long chain alcohol (product name "Nocmaster EGS", made by Ouchi Shinko Chemical Industrial, 80% of dicyclohexylamine salt of ethyleneglycol and 20% of long chain alcohol (1-tetradecanol, 1-hexadecanol, and 1-octadecanol), basic cross-linking accelerator) 4 parts and hexamethylenediamine carbamate (product name "Diak#1", made by Dupont Dow Elastomer, polyamine cross-linking agent) 2.4 parts to obtain a cross-linkable rubber composition.

Further, the obtained cross-linkable rubber composition was used to measure the normal physical properties (tensile strength, tensile stress, elongation, hardness) and compression set (disk compression set and O-ring compression set). The results are shown in Table 1.

Example 2

Except for using, instead of the carboxyl group-containing nitrile rubber (a1) which was obtained in Production Example 1, 100 parts, the carboxyl group-containing nitrile rubber (a2) which was obtained at Production Example 2, 100 parts and changing the amount of the hexamethylenediamine carbamate (product name "Diak#1", made by Dupont Dow Elastomer, polyamine cross-linking agent) 2.4 parts to 1.9 parts, the same procedure was followed as in Example 1 to obtain the cross-linkable rubber composition.

Further, the obtained cross-linkable rubber composition was used to measure the normal physical properties (tensile strength, tensile stress, elongation, hardness) and compression set (disk compression set and O-ring compression set). The results are shown in Table 1.

Example 3

Except for using, instead of the carboxyl group-containing nitrile rubber (a1) which was obtained in Production Example 1, 100 parts, the carboxyl group-containing nitrile rubber (a3) which was obtained at Production Example 3, 100 parts and changing the amount of the hexamethylenediamine carbamate (product name "Diak#1", made by Dupont Dow Elastomer, polyamine cross-linking agent) 2.4 parts to 2.7 parts, the same procedure was followed as in Example 1 to obtain the cross-linkable rubber composition.

Further, the obtained cross-linkable rubber composition was used to measure the normal physical properties (tensile strength, tensile stress, elongation, hardness) and compression set (disk compression set and O-ring compression set). The results are shown in Table 1.

Example 4

Except for using, instead of the carboxyl group-containing nitrile rubber (a1) which was obtained in Production Example 1, 100 parts, the carboxyl group-containing nitrile rubber (a4) which was obtained in Production Example 4, 100 parts and changing the amount of the hexamethylenediamine carbamate (product name "Diak#1", made by Dupont Dow Elastomer, polyamine cross-linking agent) 2.4 parts to 2.0 parts, the same procedure was followed as in Example 1 to obtain the cross-linkable rubber composition.

Further, the obtained cross-linkable rubber composition was used to measure the normal state physical properties (tensile strength, tensile stress, elongation, hardness) and compression set (disk compression set and O-ring compression set). The results are shown in Table 1.

Comparative Example 1

Except for using, instead of a mixture of a mixture of a dicyclohexylamine salt of ethyleneglycol and long chain alcohol (product name "Nocmaster EGS", made by Ouchi Shinko Chemical Industrial, 80% of dicyclohexylamine salt of ethyleneglycol and 20% of long chain alcohol (1-tetradecanol, 1-hexadecanol, and 1-octadecanol), basic cross-linking accelerator) 4 parts, DBU (product name "Rhenogran XLA-60 (GE2014)", made by RheinChemie, comprised of 60% of DBU (including parts forming zinc dialkyldiphosphate) and 40% of an acrylic acid polymer and dispersant, basic cross-linking accelerator) 4 parts, the same procedure was followed as in Example 1 to obtain the cross-linkable rubber composition.

Further, the obtained cross-linkable rubber composition was used to measure the normal physical properties (tensile strength, tensile stress, elongation, hardness) and compression set (disk compression set and O-ring compression set). The results are shown in Table 1.

Comparative Example 2

Except for using, instead of a mixture of a dicyclohexylamine salt of ethyleneglycol and long chain alcohol (product name "Nocmaster EGS", made by Ouchi Shinko Chemical Industrial, 80% of dicyclohexylamine salt of ethyleneglycol and 20% of long chain alcohol (1-tetradecanol, 1-hexadecanol, and 1-octadecanol), basic cross-linking accelerator) 4 parts, 1,3-di-o-tolylguanidine (product name "Noccelar DT", made by Ouchi Shinko Chemical Industrial, basic cross-linking accelerator) 2 parts, the same procedure was followed as in Example 1 to obtain the cross-linkable rubber composition.

Further, the obtained cross-linkable rubber composition was used to measure the normal physical properties (tensile strength, tensile stress, elongation, hardness) and compression set (disk compression set and O-ring compression set). The results are shown in Table 1.

TABLE 1

| | | Example 1 | Example 2 | Example 3 | Example 4 | Comparative Example 1 | Comparative Example 2 |
|---|---|---|---|---|---|---|---|
| Composition of cross-linkable rubber composition | | | | | | | |
| Carboxyl group-containing nitrile rubber (a1) | (parts) | 100 | — | — | — | 100 | 100 |
| Carboxyl group-containing nitrile rubber (a2) | (parts) | — | 100 | — | — | — | — |
| Carboxyl group-containing nitrile rubber (a3) | (parts) | — | — | 100 | — | — | — |
| Carboxyl group-containing nitrile rubber (a4) | (parts) | — | — | — | 100 | — | — |
| FEF carbon black (Seast SO) | (parts) | 40 | 40 | 40 | 40 | 40 | 40 |
| Plasticizer (AdekasizerC-8) | (parts) | 5.3 | 5.3 | 5.3 | 5.3 | 5.3 | 5.3 |
| Antiaging agent (Nocrac CD) | (parts) | 1.6 | 1.6 | 1.6 | 1.6 | 1.6 | 1.6 |
| Stearic acid | (parts) | 1 | 1 | 1 | 1 | 1 | 1 |
| Polyoxyethylene alkyl ether phosphoric acid ester | (parts) | 1 | 1 | 1 | 1 | 1 | 1 |
| Polyamine cross-linking agent (Diak#1) | (parts) | 2.4 | 1.9 | 2.7 | 2.0 | 2.4 | 2.4 |
| Dicyclohexylamine salt of ethyleneglycol 80% and long chain alcohol 20% (Nocmaster EGS) | (parts) | 4.0 | 4.0 | 4.0 | 4.0 | — | — |
| DBU (Rhenogran XLAA-60 (GE2014)) | (parts) | — | — | — | — | 4.0 | — |
| 1,3-di-o-tolylguanidine (Noccelar DT) | (parts) | — | — | — | — | — | 2.0 |
| Evaluation of cross-linked rubber | | | | | | | |
| Tensile strength | (MPa) | 28.0 | 27.5 | 28.2 | 28.1 | 22.1 | 24.3 |
| Elongation | (%) | 320 | 320 | 320 | 320 | 260 | 280 |
| 100% tensile stress | (MPa) | 5.7 | 5.8 | 5.9 | 5.8 | 5.8 | 5.4 |
| Hardness | (Duro-A) | 71 | 69 | 70 | 73 | 72 | 71 |
| Compression set (disk compression set) | (%) | 4.6 | 5.2 | 3.9 | 4.8 | 20.2 | 28.0 |
| Compression set (O-ring compression set) | (%) | 7.8 | 8.9 | 6.9 | 7.6 | 34.7 | 42.2 |

(Note 1)
Carboxyl group-containing nitrile rubber (a1) is acrylonitrile-butadiene-mono-n-butyl maleate copolymer
(Note 2)
Carboxyl group-containing nitrile rubber (a2) is acrylonitrile-butadiene-n-butyl acrylate-mono-n-butyl maleate copolymer
(Note 3)
Carboxyl group-containing nitrile rubber (a3) is acrylonitrile-butadiene-methoxyethyl acrylate-mono-n-butyl maleate copolymer
(Note 4)
Carboxyl group-containing nitrile rubber (a4) is acrylonitrile-butadiene-mono n-butyl maleate copolymer From Table 1, the cross-linked rubbers which were obtained by using the cross-linkable rubber compositions which comprises the carboxyl group-containing nitrile rubbers (a1), (a2), (a3), and (a4) into which a polyamine cross-linking agent and the basic cross-linking accelerator (C) having the specific structure prescribed in the present invention were blended were extremely excellent in compression set resistance (Examples 1 to 4).

On the other hand, when using, instead of the basic cross-linking accelerator (C) having the specific structure prescribed in the present application, DBU (1,8-diazabicyclo[5,4,0]undecene-7) as the basic cross-linking accelerator, the compression set resistance was inferior (Comparative Example 1).

Furthermore, when using, instead of the basic cross-linking accelerator (C) having the specific structure prescribed in the present application, 1,3-di-o-tolylguanidine as the basic cross-linking accelerator as well, the compression set resistance was inferior (Comparative Example 2).

The invention claimed is:

1. A cross-linkable rubber composition containing a carboxyl group-containing nitrile rubber (A) with an iodine value of 120 or less, a polyamine cross-linking agent (B), a basic cross-linking accelerator (C) which is expressed by the following general formula (1):

$$R^1-NH-R^2 \qquad (1)$$

(where in general formula (1), $R^1$ and $R^2$ are, respectively independently, alkyl groups containing 1 to 12 carbon atoms which may have substituents or cycloalkyl groups containing 5 to 12 carbon atoms which may have substituents), and
an alkyleneglycol containing 2 to 3 carbon atoms,
wherein the basic cross-linking accelerator (C) forms a salt with the alkyleneglycol.

2. The cross-linkable rubber composition according to claim 1 wherein the basic cross-linking accelerator (C) is expressed by the following general formula (2):

$$R^3-NH-R^4 \qquad (2)$$

(where in general formula (2), $R^3$ and $R^4$ are, respectively independently, cycloalkyl groups containing 5 to 8 carbon atoms).

3. The cross-linkable rubber composition according to claim 2 wherein the basic cross-linking accelerator (C) is dicyclopentylamine or dicyclohexylamine.

4. The cross-linkable rubber composition according to claim 1, which further contains an alkyl alcohol containing 5 to 20 carbon atoms.

5. A cross-linked rubber obtained by cross-linking the cross-linkable rubber composition according to claim 1.

6. The cross-linked rubber according to claim 5 which is a seal member.

7. A cross-linked rubber obtained by cross-linking the cross-linkable rubber composition according to claim 2.

8. A cross-linked rubber obtained by cross-linking the cross-linkable rubber composition according to claim 3.

9. A cross-linked rubber obtained by cross-linking the cross-linkable rubber composition according to claim 4.

10. The cross-linkable rubber composition according to claim 1 wherein the alkyleneglycol is ethyleneglycol.

* * * * *